ced Dec. 6, 1960

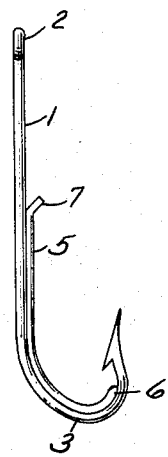
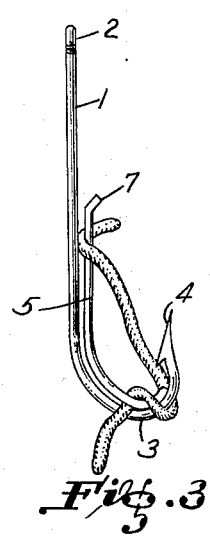
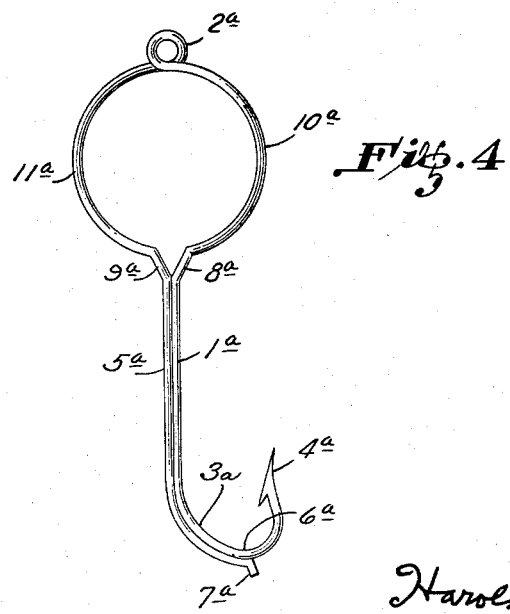

2,962,834

ATTACHMENT FOR FISHHOOKS

Harold S. Stinson, 11777 Clayton Road, St. Louis 22, Mo.

Filed July 21, 1958, Ser. No. 749,723

4 Claims. (Cl. 43—44.6)

The invention has to do with the art of fishing and relates more particularly to that type of the fishing art where fishing-worms, and that type of bait, are used to attract fish and it consists substantially in an improved simple way of attaching that type of bait to a fish-hook through the employment of such features of construction, arrangement, and combination of parts as will hereinafter be described and distinctly claimed.

The following are among the objects of the invention:

To provide a simple improved method of attaching a fishing-worm, or bait of a similar nature, to a fish-hook without piercing the worm with the burr of the hook; to provide an attachment for a fish-hook which will enable the fisherman to clip, or clamp, a worm to the bend of the hook, and particularly to the inside of the bend, or the outside edge of the bend of the hook; to provide a means for clipping one end of a worm to the bend of the hook, wrap it around the bend, and then clip the other end of the worm to the shank of the fish-hook; to provide a fish-hook having a clamping element which is so arranged that bait can be inserted into the clamp from its upper extremity as well as its lower extremity; and other objects and advantages which will become apparent to those skilled in the art.

I do not limit the invention to the embodiments shown as modifications of the invention may be resorted to without departing from the spirit thereof or the scope of the claims.

In the drawings:

Figure 1 is a side elevational view of a typical embodiment of the invention showing a clip, or clamp, aligned on the inside of the bend of the hook.

Figure 2 is a front elevational view of the same.

Figure 3 is a side elevational view of the invention showing one of the ways a worm may be introduced into the device.

Figure 4 is a side elevational view of a modification of the invention contemplated as within the scope of the claims, showing an open area above the shanks.

The present form of the invention, as illustrated in the drawings, consists of an ordinary fish-hook having a shank 1, a line-attaching end loop 2, a bend 3, and a burr 4. A clip, or clamp, 5 is attached to the inside of the bend 3 of the hook at a point designated by the numeral 6 and being approximately at a point in the bend of the hook between the burr 4 and the center of the bottom of the bend 3. Said clip, or clamp, extends from the point of connection 6 along the inside of the bend of the hook toward the shank of the fish-hook 1. It may then be extended upwardly along a portion of the lower extremity of said shank 1 where it terminates. The extremity of the clip 5 has a bend 7 inclining away from the shank 1, thus providing an inclined face element between said shank 1 and the upper extremity of the clip 5.

In the operation of the device, one end of a fishing-worm, or similar bait, is placed between the bend 7 and the shank 1 and then pulled downwardly, thereby prying the clip 5 away from the shank 1 to accommodate the end of the worm. The worm end is then slipped downwardly between said shank 1 and clip 5 and also along the inside of the bend 3 of the hook to the point where the clip 5 is attached to the inside of the bend of the hook, which is designated as 6. The main body of the worm is then wrapped around the bend 3 of the hook after which the free end of the worm is placed between the element 7 and the shank 1 and pulled causing it to be wedged into the desired position as shown in Figure 3. A worm so attached to a fish-hook has not been damaged and it will live longer; it will wiggle in an effort to get loose and in doing so will present itself as an attractive bait for fish. In introducing an extremely delicate worm into the clip unless care is exercised there is a possibility of the worm being torn. To prevent this and to assist in the operation of the device pressure between the clip 5 and the shank 1 may be released by placing the device between the fingers, one finger on the outside edge of the bottom of the bend of the hook and another finger used to exert pressure against the inclined element 7, thereby opening the clip and permitting the worm to slide all the way to its destination against the connection 6 of the clip. This last described procedure will not be necessary with the majority of worms that are used for bait.

The length of the clip 5 along the shank 1 may be varied, and it can if desired be extended all the way up to the top of said shank 1. Contemplated as within the scope of the invention is an attachment which is shown in Figure 4. It consists of a clip, or clamp, 5a which lies along the outside edge of the bend 3a starting from a point 6a in the bend of the hook. The lower extremity of the clip 5a has a bend 7a which inclines away from the bend 3a, and it is shaped substantially to correspond with the shape of the bend 3a and is normally pressed against said bend 3a in abutting engagement. The clip 5a after extending along the outside edge of the bend 3a continues along the side of the shank 1a for its entire length. The upper extremities of the fish-hook shank 1a as well as the upper extremity of the clamp 5a are each bent in a direction inclining away from each other as shown in Figure 4 and designated as bend 8a and 9a respectively. Extending upwardly from the bends 8a and 9a, in the present form of the invention, are two approximate half-circular formations which are designated 10a and 11a respectively, and which are connected together at their upward extremities by a line-attaching end loop 2a. This construction provides an open space above the shank 1a and the clip 5a and this enclosed open area is utilized for the purpose of introducing bait between the upper extremities of the clip 5a and the shank 1a. It will be noted from the drawing that the clip 5a and the shank 1a of the fish-hook are substantially parallel and are normally in abutting engagement.

In the operation of this latter form of the invention, a worm is wedged between the lower extremity of the clip 5a and the outside edge of the bend 3a of the fish-hook which is accomplished by placing one end of the worm between the inclined element 7a and the bend 3a and pulling it between said clip and bend. The worm is then wrapped around the bend 3a of the fish-hook and the other end of the worm is wedged between the upper extremities of the clip 5a and shank 1a. This is done by placing the end of the worm between the bent ends 8a and 9a and pulling the worm in a downward direction, whereupon the clip 5a will open to receive the worm end. Through the employment of this latter form of the invention the worm is caused to extend higher up on the shank of the fish-hook.

It will be clear to those skilled in the art that a clip, or clamp, of the type illustrated and described may be positioned to operate adjacent the inside of the bend of the hook as set forth in the first embodiment of the invention, or it may be positioned along the outside edge of the bend of the hook as explained in the latter embodiment of the invention. Equally good results may be obtained by positioning the clip on either side of the bend of the hook.

It is to be understood that the foregoing description and the accompanying drawings have been given only by way of illustration and example, and that changes and alterations in the present disclosure are contemplated as within the spirit of the present invention and the scope of the claims.

What I claim is:

1. In combination, a fish-hook having an element composed of a shank, a bend and a burr, a clamping element normally disposed in engagement with said shank and at least a portion of said bend, the upper extremities of the two elements each having a bend disposed outwardly from one another thereby forming an inwardly converging bait receiving opening whereby bait material may be used as a wedge to open the clamp, an upwardly extending approximate half circle element integral with each of said outwardly disposed bends, thus providing an opening between the said half circular elements so that bait material may be inserted in the opening thus provided and then used as a wedge to open the clamp, and a connection of the upper extremities of the two approximate half circle elements.

2. In combination, a fish-hook having an element composed of a shank and a bend, a clamping element normally disposed in engagement with the said shank and at least a portion of said bend, the upper extremities of the two elements each having a bend disposed outwardly from one another thereby forming an inwardly converging bait receiving opening whereby bait material may be used as a wedge to open the upper end of the clamp, the lower extremity of the clamping element having a bend disposed outwardly from the bend of said fish-hook thereby forming an inwardly converging bait receiving opening whereby bait material may be used as a wedge to open the lower end of the clamp, and a connection attaching said clamping element to said fish-hook.

3. In a combination, a fish-hook having an element composed of a shank and a bend, a clamping element normally disposed in engagement with said shank and at least a portion of said bend, the upper extremities of the two elements each having a bend disposed outwardly from one another thereby forming an inwardly converging bait receiving opening whereby bait material may be use as a wedge to open the upper end of the clamp, the lower extremity of the clamping element having a bend disposed outwardly from the bend of said fish-hook thereby forming an inwardly converging bait receiving opening whereby bait material may be used as a wedge to open the lower end of the clamp, an upwardly extending element integral with the upper extremity of each outwardly disposed bend, said elements being formed to provide an opening between them, so that bait material may be inserted in the opening thus provided and then used as a wedge to open the clamp, and a connection of the upper extremities of said two elements.

4. In combination, a fish-hook having an element composed of a shank and a bend, a clamping element normally disposed in engagement with said shank and at least a portion of said bend, the upper extremities of the two elements each having a bend disposed outwardly from one another thereby forming an inwardly converging bait receiving opening whereby bait material may be used as a wedge to open the upper end of the clamp, the lower extremity of the clamping element having a bend disposed outwardly from the bend of said fish-hook thereby forming an inwardly converging bait receiving opening whereby bait material may be used as a wedge to open the lower end of said clamp, an approximate half-circle formation attached to the outwardly disposed bend at the upper extremity of each element, and a line-attaching end loop forming a connection attaching the upper extremities of the two half-circle formations.

References Cited in the file of this patent

UNITED STATES PATENTS

| | | |
|---|---|---|
| 666,309 | Fiege | Jan. 22, 1901 |
| 990,095 | Balcom | Apr. 18, 1911 |
| 1,750,783 | Pemberton | Mar. 18, 1930 |
| 1,875,182 | Southwell | Aug. 30, 1932 |
| 2,215,612 | Hathaway | Sept. 24, 1940 |
| 2,605,580 | Moore | Aug. 5, 1952 |